United States Patent
Rush

[11] 3,986,936
[45] Oct. 19, 1976

[54] SOLAR HEATED EVAPORATING AND CONDENSING UNIT

[76] Inventor: Martin A. Rush, 2501 Cincinnati-Dayton Road, Middletown, Ohio 45042

[22] Filed: Nov. 7, 1974

[21] Appl. No.: 521,945

[52] U.S. Cl. ............................ 202/234; 203/DIG. 1
[51] Int. Cl.[2] ............................................ B01D 3/00
[58] Field of Search ............... 202/234, 185, 185 A; 203/DIG. 1; 159/1 S, 4 K, 4 GC

[56] References Cited
UNITED STATES PATENTS

| 983,424 | 2/1911 | Brosius | 159/1 S |
|---|---|---|---|
| 1,493,756 | 5/1924 | La Bour | 159/48 L |
| 2,820,744 | 1/1958 | Lighter | 202/234 |
| 2,848,389 | 8/1958 | Bjorksten | 202/234 |
| 3,311,543 | 3/1967 | Loebel | 202/234 X |
| 3,334,026 | 8/1967 | Dobell | 159/1 S |
| 3,351,536 | 11/1967 | Fox | 202/234 |
| 3,367,787 | 2/1968 | Thijssen et al. | 159/4 GC |
| 3,501,381 | 3/1970 | Delano | 202/234 |

FOREIGN PATENTS OR APPLICATIONS

| 1,261,066 | 4/1961 | France | 159/4 GC |
|---|---|---|---|

Primary Examiner—Jack Sofer
Attorney, Agent, or Firm—Clarence A. O'Brien; Harvey B. Jacobson

[57] ABSTRACT

A buoyant elongated trough-like structure closed throughout an upper portion thereof by means of a transparent panel for passing radiant energy from the sun therethrough is provided and a portion of the interior of the trough below the transparent panel defines an open top compartment for receiving water to be evaporated and subsequently condensed. Lower and upper portions of one wall of the trough include inlet and outlet openings extending along the trough and a hollow U-shaped manifold extends longitudinally of the slotted side wall of the trough and opens toward the latter including a lower hollow leg opening into the interior of the trough through the lower slot and a hollow upper leg opening into the trough through the upper slot. The ends of the legs of the manifold remote from the trough are joined by means of an integral hollow bight portion. Further, a tapered baffle extends along the inner surface of the slotted side wall of the trough intermediate the upper and lower slots and projects inwardly of the slotted trough side wall. The interior of the trough disposed below the transparent panel, the upper and lower slots and the hollow U-shaped manifold define a closed loop passageway through which convection air may pass outwardly through the outlet slot and into the upper leg of the U-shaped manifold, downwardly through the hollow bight portion of the manifold, inwardly toward and through the inlet slot of the trough side wall via the lower leg of the U-shaped slot and about the tapered baffle before again passing outwardly through the outlet slot and into the U-shaped manifold. The open top of the water compartment within the trough below the transparent panel is communicated with the aforementioned convection passage for the ready commingling of water vapor escaping from the surface of the water heated within the compartment with the air circulating through the convection passage, the walls of the trough-like buoyant structure being insulative and the U-shaped manifold being disposed exteriorly of the buoyant trough structure below the normal water level thereof and also constructed of a material having good heat transferring properties as well as being provided with a lower sump portion for the collection of condensed water therein.

6 Claims, 4 Drawing Figures

SOLAR HEATED EVAPORATING AND CONDENSING UNIT

This invention comprises an improvement over the solar powered sea water condensing unit disclosed in my copending U.S. application Ser. No. 485,577, filed July 3, 1974.

BACKGROUND OF THE INVENTION

Solar stills have been heretofore designed but most have included structural features which do not adapt the stills for use in an environment dominated by a large body of water. Further, most solar stills are not constructed in a manner whereby the most rapid vaporization of water possible is accomplished thereby.

While the prior art does include stills which utilize some of the basic components of the instant invention even these previously known devices are not constructed in a manner conducive to extremely rapid vaporization and subsequent condensation of water for a given amount of sunlight incident thereon. Examples of previously patented solar stills utilizing some of the components of the instant invention are disclosed in U.S. Pat. Nos. 1,302,363, 2,424,142, 3,138,546, 3,501,381 and 3,775,257.

BRIEF DESCRIPTION OF THE INVENTION

The solar still of the instant invention has been designed for use in small and large scale installations and is capable of evaporating and condensing quantities of water which are relatively large in volume for a given amount of sunlight incident upon the still as compared to the capacity of previously known solar stills. The still may be constructed of such large dimensions as to have a relatively high capacity to provide the fresh water needs of communities of various sizes and it may also be constructed of such small dimensions to render it highly adaptable to provide condensed or distilled water for use by single persons or small groups of persons such as may find themselves adrift on a large body of salt water without a supply of fresh drinking water.

The main object of this invention is to provide an efficient solar still for the purpose of providing distilled water from sea water.

Another object of this invention is to provide a solar still which may be readily constructed of various sizes and thus to provide various water distilling capacities.

A still further object of this invention is to provide a solar still constructed in a manner so that it may be operative while floating in a large body of sea water.

Another object of this invention is to provide a solar still which will be capable of sufficiently ventilating the surface of the quantity of water being evaporated by the still so as to effectively hasten the process of water evaporation.

A final object of this invention to be specifically enumerated herein is to provide a solar still in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
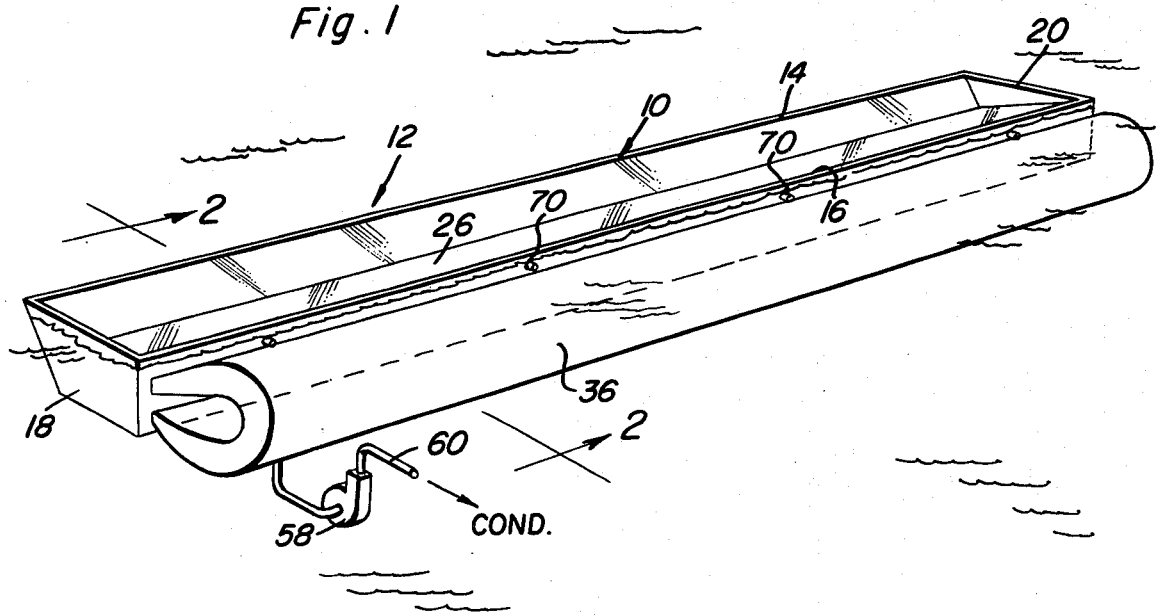
FIG. 1 is a perspective view of a solar still constructed in accordance with the present invention and illustrating the still afloat upon a large body of salt water.
Figure 2:
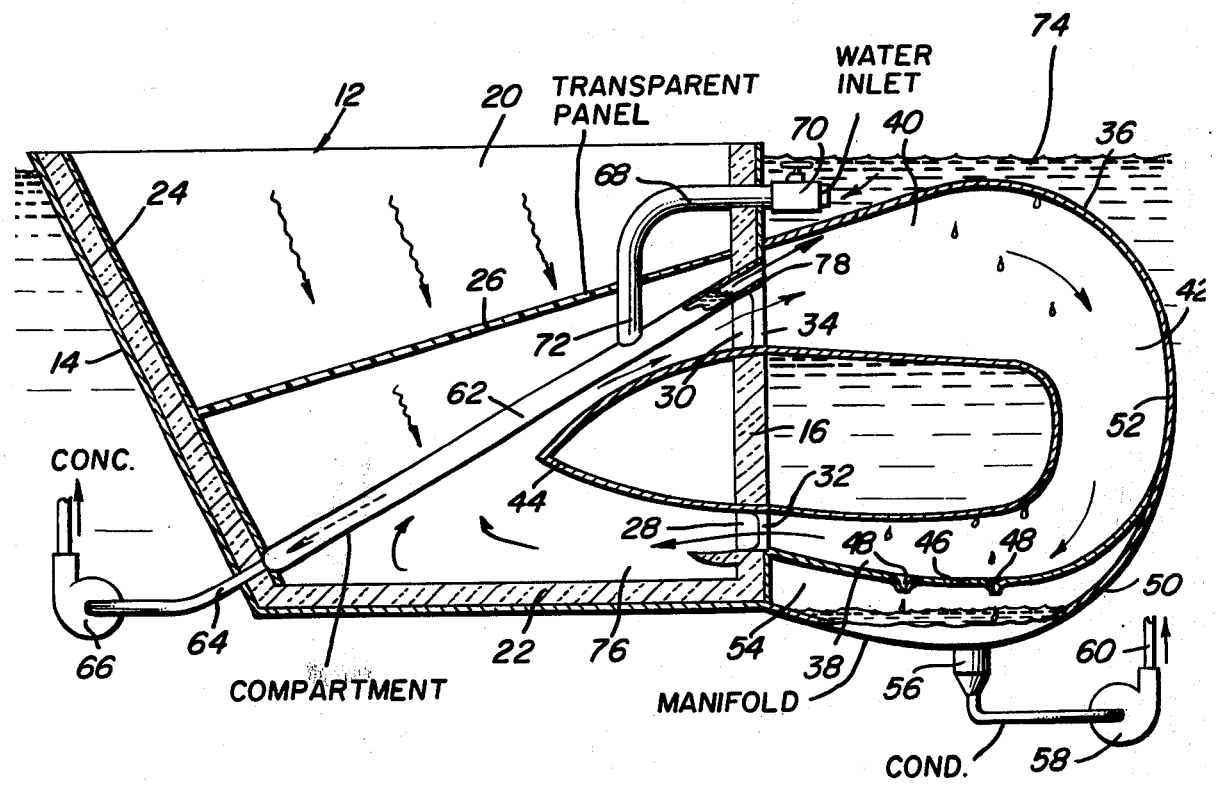
FIG. 2 is an enlarged transverse vertical sectional view taken substantially upon the plane indicated by the section line 2—2 of FIG. 1.

Referring now more specifically to the drawings and to FIGS. 1 and 2 in particular, the reference numeral 10 generally designates a first form of solar still constructed in accordance with the present invention. The still 10 includes an elongated buoyant trough referred to in general by the reference numeral 12 and including opposite side longitudinal walls 14 and 16 interconnected at corresponding ends by means of end walls 18 and 20. The lower marginal edge portions of the walls or wall portions 14, 16, 18 and 20 are interconnected by means of a horizontal bottom wall 22.

The walls 14, 16, 18 and 20 as well as the bottom wall 22 are constructed of heat insulative material or at least lined on their inner surfaces by means of a heat insulative layer. Also, the inner surface of the longitudinal side wall 14 is provided with a light-reflective coating or panel 24.

An inclined panel 26 of transparent material closes an upper portion of the interior of the trough 12. The panel 26 extends between the upper marginal portions of the end walls 18 and 20, the longitudinal side wall 16 and a lower portion of the longitudinal side wall 14, the panel 26 being upwardly inclined toward the longitudinal side wall 16.

The side wall 16 includes first passage defining means in the form of an elongated longitudinally extending inlet slot 28 formed therein and second passage defining means in the form of an elongated longitudinally extending outlet slot 30 formed therein with the inlet slot 28 being formed in a lower portion of the side wall 16 and the outlet slot 30 being formed in an upper portion of the side wall 16. In order to maintain the strength of the side wall 16 both above and below the slots 28 and 30, vertical support members 32 and 34 are secured across the slots 28 and 30 at points spaced longitudinally therealong.

A generally horizontally disposed and horizontally opening hollow U-shaped manifold 36 defining a heat exchange chamber is disposed exteriorly of the side wall 16 and includes hollow lower and upper legs 38 and 40 interconnected at their ends remote from the side wall 16 by means of an integral hollow bight portion 42. The ends of the legs 38 and 40 remote from the bight portion 42 are sealingly secured to the wall 16 in registry with the slots 28 and 30 and an inwardly tapering baffle 44 is supported from the inner surface of the side wall 16 intermediate the lower and upper slots 28 and 30 and projects horizontally inwardly from the wall 16, the slots 30 and 28, and the adjacent portions of the panel 26, manifold 36 and baffle 40 defining a closed loop convection air passageway having isolated upper and lower reaches including the slots 30 and 28, respectively.

The lower leg 38 includes a lower wall portion 46 which is dished and includes outlet openings 48 spaced transversely thereof and longitudinally therealong. Also, a lower sump wall 50 underlies the bottom wall 46 and is sealingly secured to the outer wall 52 of the bight portion 42 and the lower marginal edge of the side wall 16 to thus define a closed sump 54 into which condensed water may flow through the openings 48 for collection within the sump 54. The sump 54 includes an outlet 56 with which a pump 58 including a discharge line 60 is operatively associated for pumping condensed water from the outlet 56 upwardly through the discharge line or pipe 60 to a suitable point of use (not shown), the pump 58 being powered by any suitable source.

Mounted within that portion of the interior of the trough 12 disposed below the transparent panel is a hollow panel-like enclosure defining a compartment 62 for containing sea water to be distilled and the compartment 62 is inclined in the same manner but to a slightly greater degree than the panel 26. The lower marginal edge of the compartment 62 includes a plurality of outlets 64 therefor opening through the lower marginal edge of the side wall 14 and having suitably powered pumps 66 operatively associated therewith for pumping concentrated brine from within the compartment 62. In addition, a plurality of inlet pipes 68 are spaced along the side wall 16 and include valved inlet end portions 70 disposed exteriorly of the wall 16 and outlet end portions 72 which open downwardly through the panel 26 and into the compartment 62 at points spaced therealong. The pipes or conduits 68 are provided for intaking fresh sea water into the compartment 62.

The entire still, including all of the components hereinbefore specifically described constitute a mass whose weight is slightly less than the total volume of water which may be displaced by the still 10 when the latter is submerged in a body of water such as the body 74. Accordingly, the still 10 is floatable in the body 74 of sea water with at least the upper extremities of the walls 14, 16, 18 and 20 projecting above the level of the water. However, the entire U-shaped manifold 36 is disposed below water level when the still 10 is floating in the body 74 of water.

The interior of the trough 12 below the compartment 62, the slots 28 and 30 and the manifold 36 define a closed loop passage 76 through which convection air may readily flow in a clockwise direction as viewed in FIG. 2 of the drawings.

In operation, a quantity of sea water is admitted into the interior of the compartment 62 sufficient to place the level of sea water within the compartment 62 closely adjacent the open upper marginal edge portion 78 thereof which opens into the inlet end of the leg 40 of the manifold 36 at the upper marginal portion of the outlet slot 30. The exterior of the compartment 62 is of a heat absorbing color such as black and thus the sun rays passing downwardly through the panel 26 and incident upon the compartment 62 heat the latter and thus the sea water disposed therein. Further, the air within the trough 12 immediately below the panel 26 is trapped and heated and the air beneath the compartment 62 is warmed thereby and tends to rise and pass outwardly through the slot 30 and into the leg 40 of the manifold 36. As the passage of warm air into the leg 40 passes the open upper marginal portion 78 of the compartment 62, water vapor from immediately above the surface of the level of water within the compartment 62 is drawn outwardly through the upper open marginal edge portion of the compartment 62 and commingles with the air passing into the leg 40 of the bight portion 42 from the interior of the upper portion of the trough 12 below the panel 26. Then, the moist air passing into the manifold 42 contacts the water cooled surfaces of the manifold 36 and causes an appreciable portion of the water content of the moist air to condense out on the internal surfaces of the manifold 36. The condensed water flows downwardly along the inner surfaces of the manifold 36 to the bottom wall 46 and through the openings 48 communicated with the sump 54. After an appreciable quantity of condensed water has been collected within the sump 54, the pump 58 is utilized to pump condensed water from the sump 54.

The air passing into the manifold 36 from the slot 30 passes downwardly through the bight portion 42 of the manifold 36 and then outwardly of the latter through the leg 38 of the manifold 36 into the lower portion of the interior of the trough 12 via the slot 28. At this point, the latent heat of evaporation lost as a result of the condensation of water on the inner surfaces of the manifold 36 effectively reduces the temperature of the air circulating through the manifold 36 and the interior of the trough 12 below the container 62. This cooler air enters the lower portion of the trough 12 and is subsequently again heated by and passed upwardly beneath the container 62 for repeated discharge through the slot 30 to again commingle with water vapor being discharged from the open upper marginal edge portion 78 of the compartment 62.

When the concentration of salt within the compartment 62 becomes excessive, the pump 66 is operated and the valved inlet ends 70 of the pipes 68 are opened to admit a fresh supply of sea water from the body 74 into the compartment 62.

Because of the high rate of air flow by convection currents through the air passage 76, water vapor from the surface of the water within the compartment 62 is more quickly evaporated.

Figure 3:
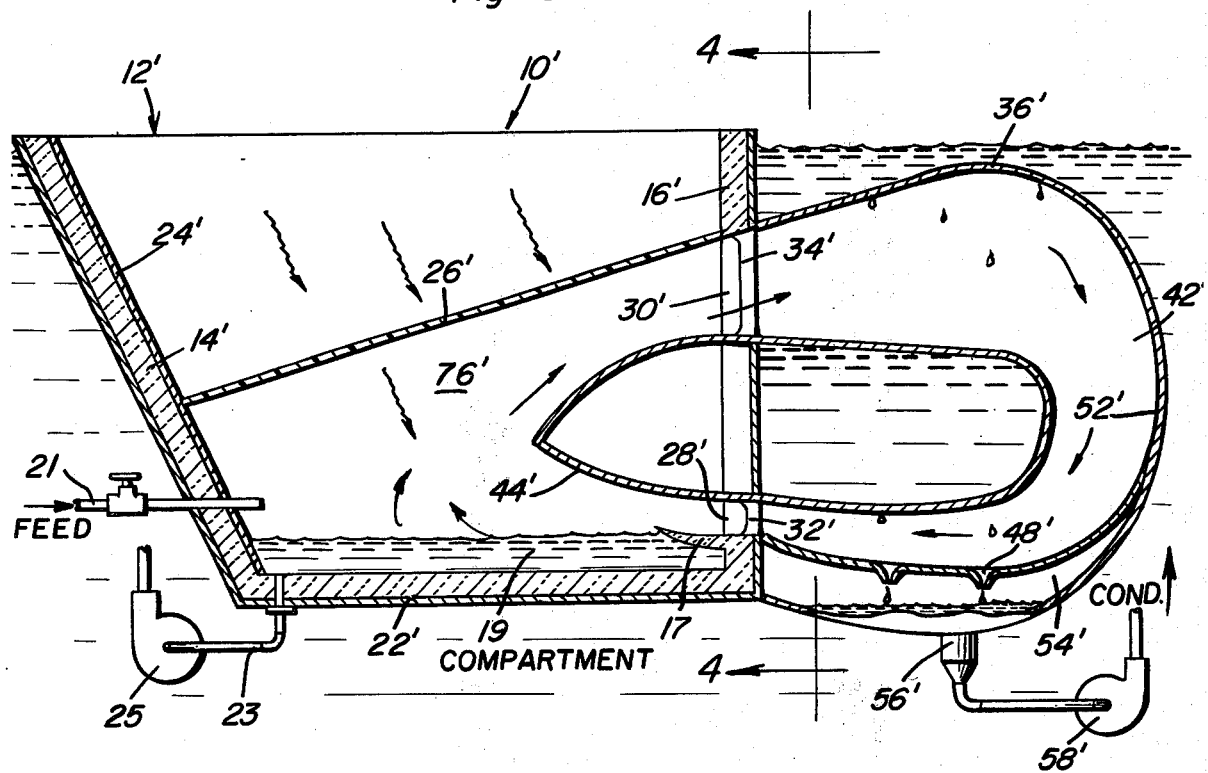
FIG. 3 is a vertical transverse sectional view similar to FIG. 2 but illustrating a slightly modified form of solar still.
Figure 4:
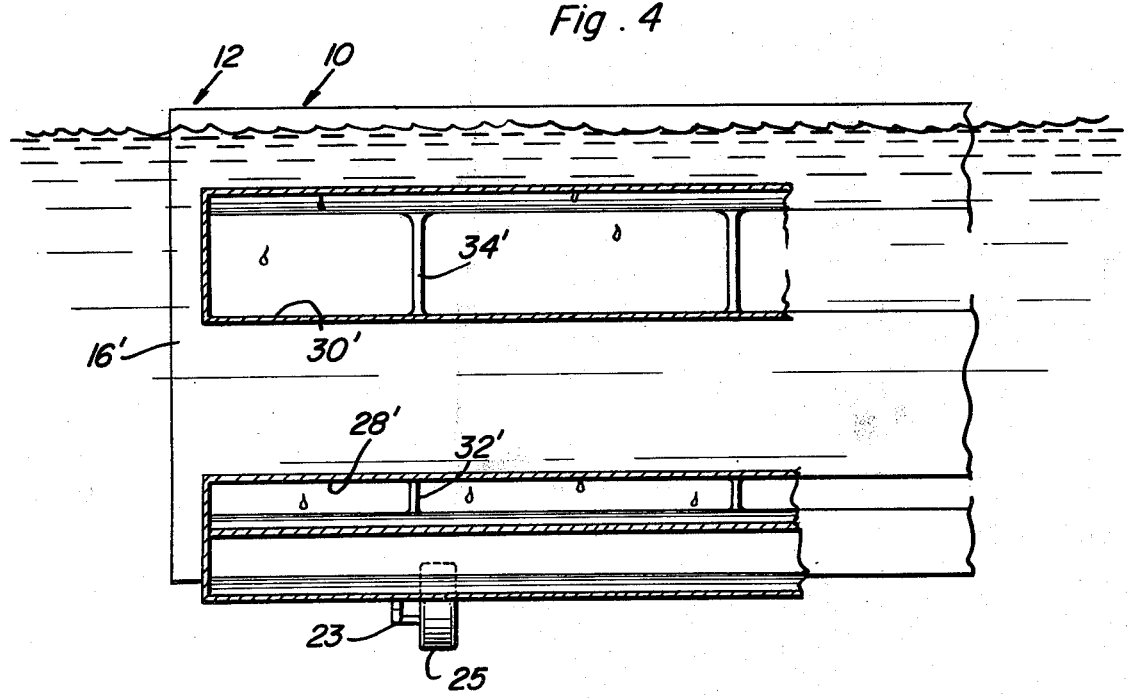
FIG. 4 is a fragmentary longitudinal vertical sectional view taken substantially upon the plane indicated by the section line 4—4 of FIG. 3.

With reference now more specifically to FIGS. 3 and 4 of the drawings, there will be seen a modified form of still referred to in general by the reference numeral 10' and which is substantially identical to the still 10 with a few exceptions. The various components of the still 10' which find their substantial equivalents in the still 10 are referred to by corresponding prime reference numerals.

The still 10' differs from the still 10 in that the still 10' does not include a component corresponding to the compartment 62. Rather, the lower portion of the side wall 16' disposed below the slot 28' includes a horizontally inwardly projecting lip 17 and the entire lower extremity of the interior of the trough 12' disposed below the lip 17 defines an open top compartment 19 for receiving sea water. In addition, a plurality of valved intake pipes 21 open through the lower portion of the side wall 14' below the panel 26' for intaking fresh supplies of sea water into the compartment 19 and a plurality of outlet pipes 23 open downwardly through the bottom wall 22' and are operatively associated with suitably driven pumps 25 for pumping concentrated brine from the compartment 19. Otherwise, the structure and operation of the still 10' is similar to the structure and operation of the still 10. However, inasmuch as the cool air entering the lower portion of the interior of the trough 12' over the lip 17 blows directly across the surface of the quantity of water disposed in the compartment 19, the vaporization of water into the air passing through the air passageway 76' is even further hastened. Of course, the water within the compartment 19 is exposed for direct sunlight incident thereon through the panel 26'. Further, the inner surface of the insulative bottom wall 22' may be of a heat-absorbing color such as black.

In FIG. 2 by constructing the condensing unit with the heating chamber below the water level on the exterior of the trough, the entire air passageway 76 including the U-shaped manifold 36 is disposed below the exterior water level and the upper reach of the passage 76 passing upwardly beneath the compartment 62 and including the upper leg 40 of the manifold 36 is upwardly inclined in the direction of convection air therethrough.

Also, the condensing unit could be land based and yet situated below the water level of an adjacent body of water or the condensing unit, the manifold 36, could be enclosed within a tank through which cooling water from an adjacent source could be rapidly circulated by gravity or by a pumping system.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A water evaporating and condensing unit including an elongated trough closed at its top by means of a transparent panel, said trough including means defining a water receiving compartment below said panel for receiving water to be evaporated therefrom and subsequently condensed, said compartment being located within said trough for direct overhead sunlight passing downwardly through said transparent panel to be incident upon said compartment, said trough including a pair of upstanding opposite side walls in the elongated direction, an elongated heat exchange manifold supported exteriorly along one of said side walls of said trough, said one side wall having vertically spaced elongated upper and lower openings formed therein, said manifold and the interior of said trough coacting to define a closed elongated loop convection air passageway including upper and lower reaches communicating through said openings, said compartment opening upwardly into the upper reach of said passageway, said unit being buoyant and floatable in a body of water with the uppermost portion of said manifold disposed below the water line of said unit, said manifold including interior cooling surface portions in good heat transfer relation with the water covered exterior surface portions of said manifold, a lower portion of said manifold adjacent the end of said lower reach remote from said compartment defining a sump in which water condensed on the inner surfaces of said manifold may collect, and means operatively associated with said sump for withdrawing condensed water therefrom.

2. The combination of claim 1 including upstanding braces disposed in and spaced along said openings rigidly connected between the portions of said one wall defining corresponding upper and lower extremities of each of said openings.

3. The combination of claim 1 wherein said lower opening is spaced at least slightly above the lower extremity of the interior of said trough, said compartment comprising the lower extremity of the interior of said trough below said lower opening with the latter positioned to discharge convection air moving through said passageway from the manifold into said trough horizontally across the surface of a quantity of water within said compartment.

4. The combination of claim 1 wherein said compartment includes water outlet and inlet means for purging concentrated water from within said compartment and admitting a fresh supply of water into said compartment.

5. The combination of claim 1 wherein said side walls of said trough, at least below said level, are heat insulative against the transmission of heat through said side walls.

6. The combination of claim 1 wherein said compartment includes a hollow panel shaped enclosure supported within said trough in at least slightly inclined position with said hollow panel inclined upwardly toward said one side wall of said trough, the upper marginal portion of said hollow panel being open and extending along a major portion of the length of said upper opening, said open upper marginal edge portion opening directly into an upper portion of said manifold through said upper opening.

* * * * *